Nov. 15, 1966 T. G. FLOROS 3,286,243

SHIFT REGISTER DESKEWING SYSTEM

Filed March 2, 1962 4 Sheets-Sheet 1

INVENTOR
THEODORE G. FLOROS

BY Joseph J. Connerton
ATTORNEY

Nov. 15, 1966 T. G. FLOROS 3,286,243

SHIFT REGISTER DESKEWING SYSTEM

Filed March 2, 1962 4 Sheets-Sheet 4

3,286,243
SHIFT REGISTER DESKEWING SYSTEM

Theodore G. Floros, Poughkeepsie, N.Y., assignor to International Business Machines Corporation, New York, N.Y., a corporation of New York Filed Mar. 2, 1962, Ser. No. 177,022
2 Claims. (Cl. 340—174.1)

Figures 1, 3:
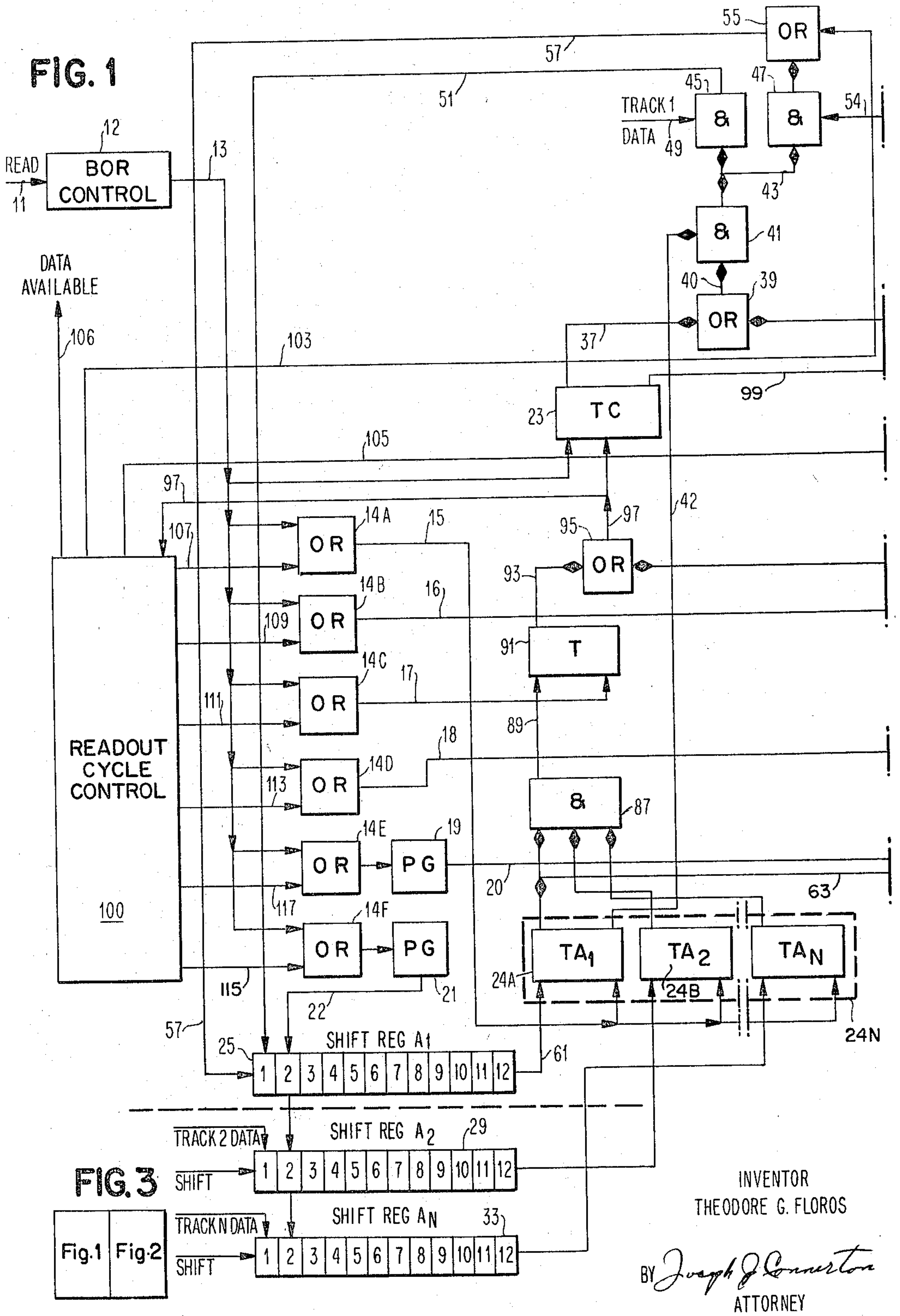

The present invention relates to a skew control system and more particularly to a deskewing system for reading high density records on magnetic tape in which the problem of skew is encountered in an intensified form.

In conventional electronic computers or data processing systems, magnetic tape units are frequently employed as input-output devices and function to store large volumes of coded characters on multi-channel tape, each such channel cooperating with an associated read-write circuit. Ideally, the bits representing magnetically recorded characters should be aligned on the record tape in a direction perpendicular to the transverse axis of the tape such that upon reading of the tape, the bits comprising a recorded character are all read simultaneously. However, various factors broadly designated as skew prevent this ideal from being achieved, particularly at high speed and/or high density recording.

The phenomenon known as skew may be defined as the difference in time measured between several read back bits of a character. Among the factors contributing to the problem of skew are misalignment between the read-write heads and the tape during the recording and reproducing operations, variations in tape speed, high frequency jitter, defects in the magnetic properties of the tape and eletcrical skew, the latter resulting from variations in the characteristics of electric and electronic components and parameters. At the high densities of present tape systems envisioned for the instant invention, the bits of a character in one track may be as much as 10 or more bits behind the corresponding bit of the same character in another track. Since skew can occur in either writing or reading, the total skew of a system is defined as the sum of the skew created in recording and in reading the character from tape.

At relatively low density recording, e.g., 500 bits per inch or less, the problem of skew can be readily compensated for with relatively simple deskewing apparatus or tape adjustments. One method for example employs variable delay lines in the read and/or write circuitry of the individual channels, adjustment of the delay lines serving to equalize the skew between the different tracks of the tape. In another conventional deskewing method a character gate of fixed length is started by the arrival of the first bit of a character. However, in the high density tape systems envisioned herein; i.e., those having recording densities of more than 5,000 bits per inch in a large number of parallel tracks, the bit period is much smaller than the total skew and the character gate method is not feasible.

Properly stated, the present invention functions to receive tape pulses arriving at various random time relationships from the tape unit and to align these pulses such that multi-bit characters are available in deskewed form at an output register. To accomplish this, the present invention contemplates a plurality of shift registers for each track on the tape, the registers being so arranged and controlled that a plurality of characters in the form of information pulses are read into alternate or successive registers wherein such characters are available for alternate or successive readout. The size of the registers employed is a function of the maximum amount of skew to be compensated for. A shift register arrangement for skew compensation utilizing shift registers is shown in U.S. Patent 2,970,300 to Witt et al., assigned to the assignee of the instant invention. In the Witt patent, a synchronizing pulse for each track is recorded on and read from the tape and used to indicate a start of message. The synchronization bit is stored in the first position of the shift register and when shifted through the register indicates that the register is filled. However, loss of a single synchronization bit can ruin the readout of an entire message or block of data, requiring backup and another attempt at reading the message. In accordance with the present invention, a prime or tag bit is inserted directly into the second position of each shift register from a source independent of tape and readout of this bit from the end of the shift register indicates a full register condition. Register switching means are provided for automatic switching of data signals to the alternate register on an individual track basis upon indication of a full register condition. The subject invention further includes means for indicating when a set of buffer shift registers are full and for causing readout of the registers upon such indication. While a message is being read out of one register, information can be read into an alternate register so that recording and readout can occur simultaneously. Thus, the time at which information is read out of the registers is independent of the time at which it is read into such registers.

Accordingly, a primary object of the invention is to provide an improved deskewing system for magnetic recording.

Another object of the present invention is to provide a magnetic tape skew compensation system independent of tape readout including a plurality of registers for each track and associated control means for automatically switching between registers upon occurrence of a full register condition.

Another object of the present invention is to provide an improved deskewing system including a pair of shifting registers for each track wherein a tag signal is directly inserted into a low order position of each register to provide a positive indication of a filled register when shifted out by succeeding data bits.

The foregoing and other objects, features and advantages of the invention will be apparent from the following more particular description of a preferred embodiment of the invention as illustrated in the accompanying drawings.

Figure 2:
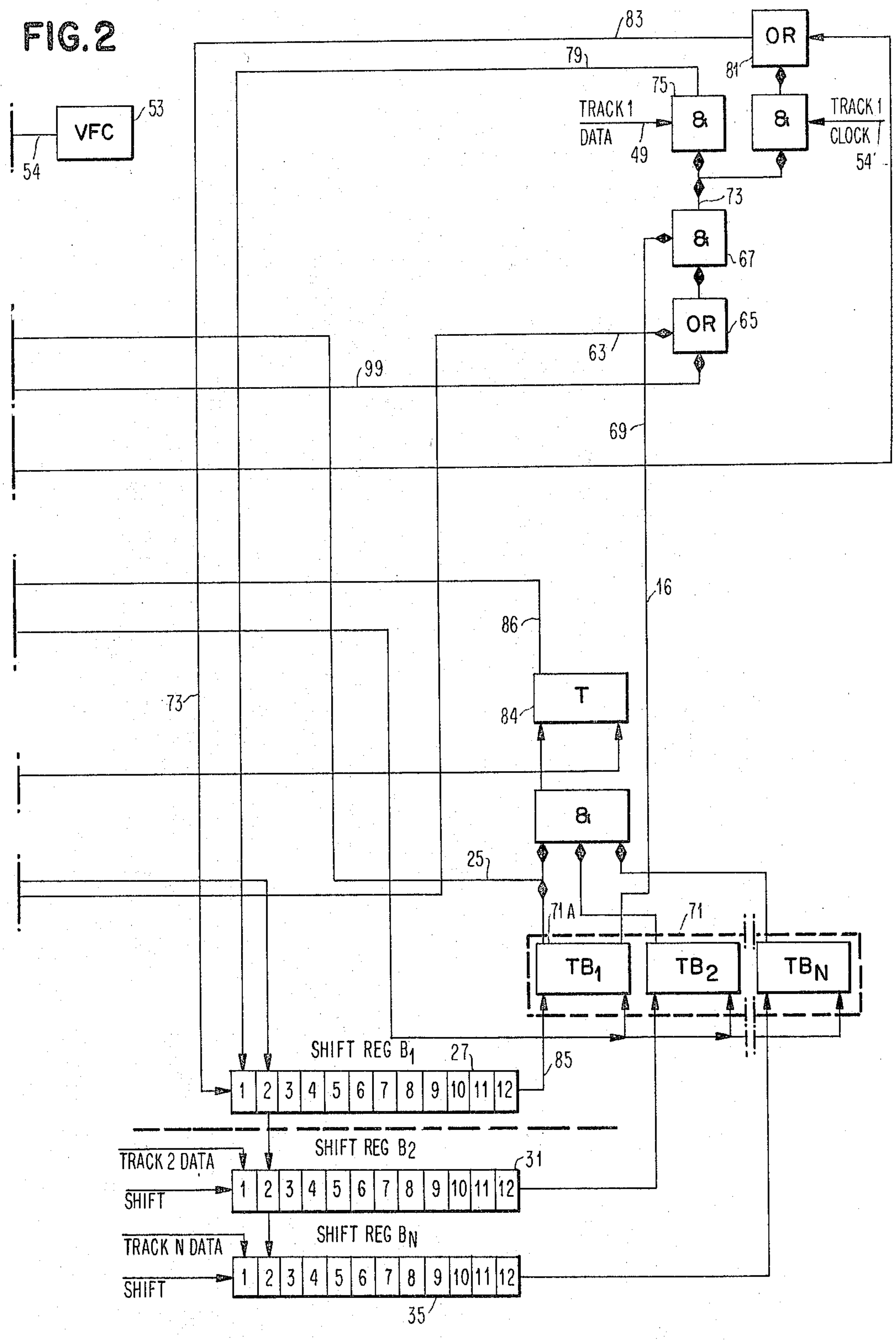

In the drawings:

FIGURES 1 and 2 illustrate in logical block form a preferred embodiment of the subject invention.

FIGURE 3 indicates the manner in which FIGURES 1 and 2 are interconnected.

Figure 4:
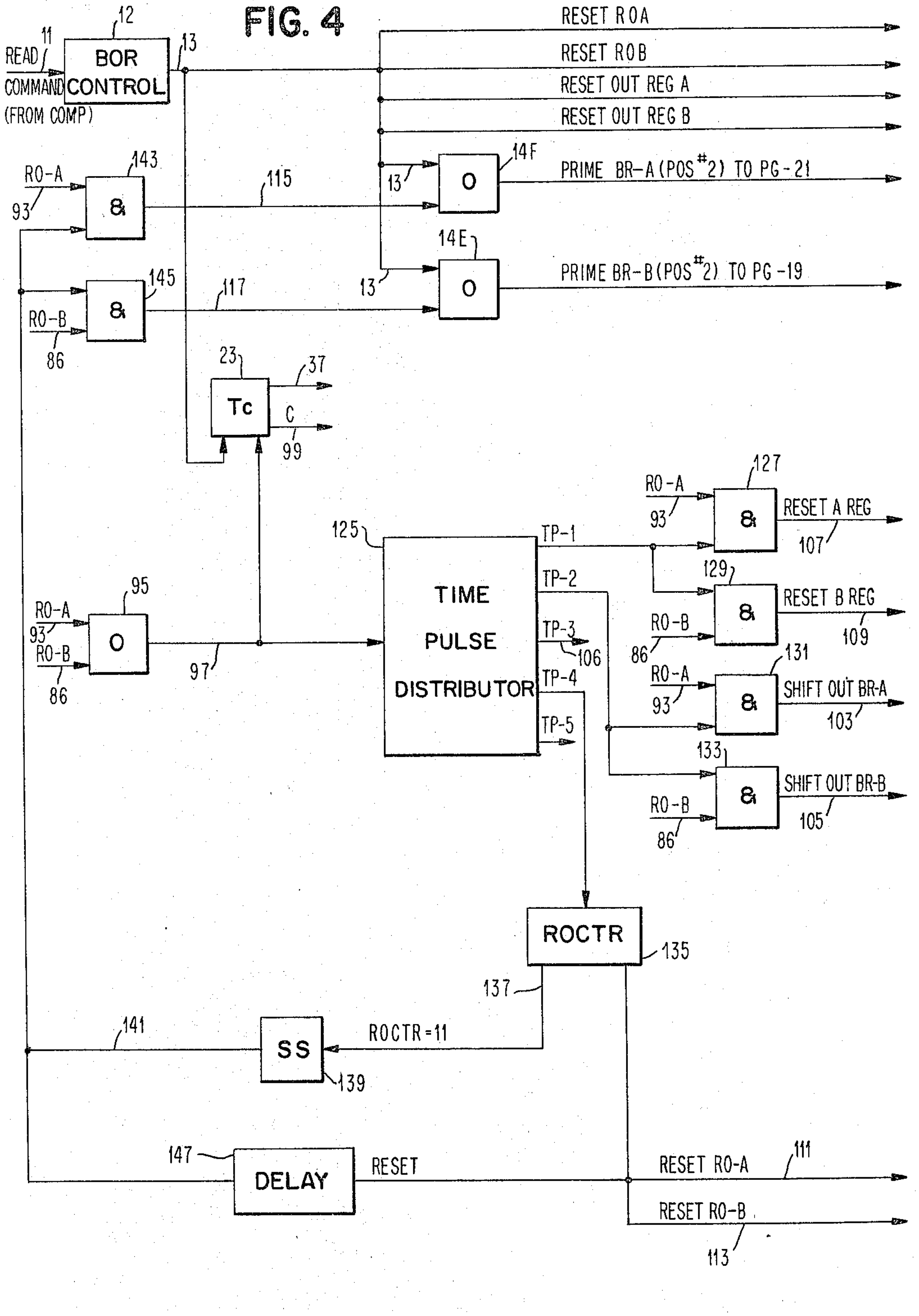

FIGURE 4 indicates the logic details of the Readout Cycle Control illustrated in block form in FIGURE 1.

Figure 5:
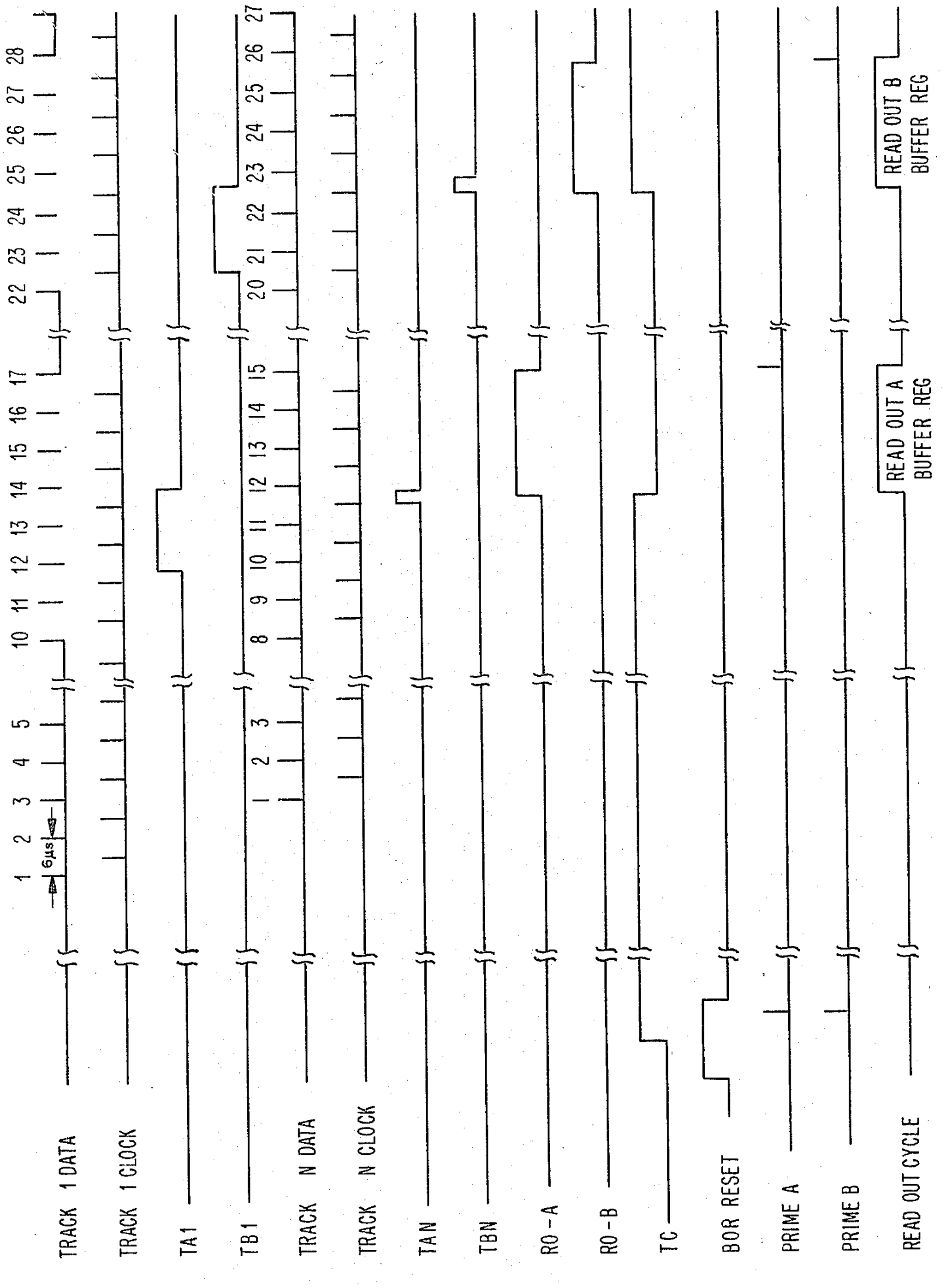

FIGURE 5 is a timing diagram defining the operating sequence of the various components of the system.

Throughout the following description and in the accompanying drawings there are certain conventions employed which are familiar to certain of those skilled in the art. Additional information concerning these conventions is as follows:

In the logical or block diagrams of the drawings an arrowhead is employed to indicate: (1) a circuit connection, (2) energization with pulse or D.C. level signals and (3) the direction of pulse travel which is also the direction of control. The input and output lines of the block symbols are connected to the most convenient side of the block for ease of illustration. A line entering a corner of a block symbol and emerging from the adjacent corner of a block symbol indicates that the pulses or D.C. levels are applied to the input of the circuit represented by the block and are simultaneously applied to additional circuits indicated by the line extension. In the description, a general arrangement of a preferred embodiment of this invention will be described with respect to the manner to which the various circuits, components and apparatus are interconnected as well as the general overall operation which is performed by these components and apparatus. The description of the general arrangements will be followed by separate and detailed descriptions of the various components and apparatus which so require it. Bold face character symbols appearing within a block symbol identify the common name of the circuit represented, that is, T identifies a trigger circuit, OR a logical OR circuit, & a logical AND circuit, PG a pulse generator and so forth. The preferred embodiment is described in terms of positive logic wherein a positive signal represents the significant level.

Referring now to the drawings and more particularly to FIGURE 1 thereof, operation of the present invention is initiated by a read pulse from the computer applied via line 11 to the Beginning of Read Control Circuit 12, labeled and subsequently designated BOR CONTROL, which generates a signal on line 13 to perform the following functions:

(1) Resets the A output register 24 through OR circuit 14A and line 15.

(2) Resets the B output register 71 through OR circuit 14B and line 16.

(3) Resets the Readout A trigger 91 through OR circuit 14C and line 17.

(4) Resets the Readout B trigger 84 through OR circuit 14D and line 18.

(5) Applies a signal through OR circuits 14E and 14F which actuate pulse generators 19 and 21 to generate the prime or tag bits which are applied to position 2 of A or B shift registers associated with each track.

(6) Sets control trigger 23 to the "one" state to cause the tape data to be initially read into the A shift registers.

In the alternate shift register embodiment herein described, shift registers 25 and 27 are associated with track 1, shift registers 29 and 31 are associated with track 2, shift registers 33 and 35 associated with track N, it being understood that each track between 2 and N has identical apparatus which has been omitted from the drawing in the interest of clarity.

In the ensuing description, the preferred embodiment will be described in terms of positive logic wherein the significant level of the logic element employed is positive. When trigger 23 is set in the one state through the output from the BOR control circuit 12, the resulting positive output on conductor 37 is applied via OR circuit 39 and line 40 to And circuit 41. The second input to And circuit 41 is provided by the zero output 42 from trigger 24A of the output buffer register. Since both inputs and And circuit 41 are positive, the resulting positive output on conductor 43 conditions And circuits 45 and 47. As heretofore described, a prime bit has been inserted in the second position of all shift registers from the BOR control circuit 12. Upon receipt of the first information bit from track 1 on line 49 labeled Track 1 Data, the resultant output from And circuit 45, conditioned in the manner heretofore above described, is applied via conductor 51 to the first position of shift register 25. Likewise, it will be appreciated that the first information signal from each track, as it becomes available, will be applied to the first position of its associated shift register through an identical circuit arrangement.

In reading information from a magnetic tape into a register, a time reference is needed to determine when each bit period occurs; i.e., the time during which a bit or character may be expected. This reference is automatically provided if a definite output of 1's and 0's read from tape and no drop out of bits occurs. In accordance with the well-known and widely used non-return to zero magnetic recording system contemplated by the present invention, the tape reading ampifiers generate an output signal only when a one is read from tape, a zero being indicated by the absence of a signal. In order to provide a definite output indication to distinguish between zero's and bit dropout, clock pulses are provided. The beginning of each record on the tape includes as part of the record a burst of 1's, which is used to initially synchronize the variable frequency clock 53 with the tape. The variable frequency clock 53 may be of any convenient structure, as for example, the variable frequency device disclosed in copending application Serial Number 745,731, now Patent No. 3,197,739, entitled "Magnetic Recording System," filed by Ernest G. Newman on June 30, 1958. In the above referred to Newman application synchronization is provided by phase comparison between the clock pulse and the tape readout pulse, the comparison circuit being part of the variable frequency clock. This phase or frequency difference between the output of the clock and the information read from the tape is utilized to correct and thus synchronize the repetition rate of the clock. To provide for the situation where the message is a long string of 0's, synchronizing pulses are recorded upon the the tape at regular intervals. Thus, for example, each fifth, eighth or tenth bit recorded along the tape channels may be a synchronizing bit. The spacing of the synchronizing bits will depend on the character of the variable frequency clock memory, certain clocks permitting much greater spacing between the synchronizing bits. In the above referred to Newman application, each fifth bit recorded along the tape channels is a synchronizing bit. Each track has its associated clock and each clock is synchronized by the information read from its own track and its own output pulse is used to sample the tape amplifier output during the bit period.

Returning to FIGURE 1, AND circuit 47, conditioned by the output from AND circuit 41 as heretofore described, upon receipt of a pulse from the variable frequency clock 53, provides an output signal through OR circuit 55 and conductor 57 to the input of shift register 25 to cause the register to shift one position to the right, each such shift causing the prime or tag bit initially inserted into position 2 of the register to be advanced one position to the right. The above-described operation is repeated until the prime bit initially inserted into position 2 of the shift register is shifted from the 12th position in the illustrated embodiment on line 61 to thereby set output trigger 24A to its one state. However, as previously noted, it will be appreciated that the size of the shift register can be more or less than 12 positions and vary as a function of the anticipated skew and the time required for register readout. Obviously the shift register could be readily extended or contracted in accordance with the anticipated skew.

At some interval before the first B shift register has been filled by the tape data, all A shift register will have been read out into the 12 associated readout triggers, since it is an obvious system requirement that the shift register capacity be greater than the anticipated skew. At this time, all inputs to AND circuit 87, one input for each track of the tape, will be positive, thereby providing a positive output on conductor 89 to set trigger 91 in the one state. The resultant positive output on conductor 93 is applied via OR circuit 95 and conductor 97 to complement trigger 23 to the "zero" state, thus applying a positive signal through OR circuit 95, and complementing trigger 23 to its zero state, thereby deconditioning AND circuits 41, 45 and 47.

When trigger 24A is switched to its one state as above described, the one output of trigger 24A on conductor 63 is applied through OR circuit 65 to AND circuit 67, previously conditioned from the reset output 69 of trigger 71A of the B output register 71. Since both inputs to AND circuit 67 are positive, a positive output on line 73 conditions AND circuits 75 and 77. Upon receipt of the next track data pulse on conductor 49 applied to AND circuits 45 and 75 associated with the A and B buffer shift registers respectively, an output from AND circuit 75 indicative of the data bit is provided via conductor 79 to be inserted into the first position of the B shift register 27 in the manner heretofore described with reference to A shift register 25. The prime bit had previously been inserted into position 2 of shift register 25 from the BOR Control Circuit 12. Upon the occurrence of the next clock pulse, variable frequency, clock 53 applies a signal via line 54 to OR circuit 81, the resultant output on conductor 83 causing shift registers 27, 31 and 35 to shift one position to the right. Thereafter the sequence of operation proceeds wherein the data is stored and shifted through the shift register until the prime bit is shifted out of position 12 on line 85 to set trigger 71, the resulting potential being applied through conductor 69 to condition AND circuit 67. This potential will replace the potential on line 63 from trigger 24A when the readout cycle control discussed subsequently resets trigger 24A. To provide readout of the words stored in the A shift registers 25, 29, 33, triggers 24A, 24B, 24N, associated with tracks *a* to *n* will func- as output registers for the particular track with which they are associated. In this way the transfer of control to direct the data into the B register upon a full register indication of Register A is automatically accomplished.

The output signal on conductor 97, in addition to complementing trigger 23, is applied to the readout cycle control 100. The readout cycle control 100 is essentially a signal distributor which when actuated by a signal on line 97 generates a number of signals in a predetermined sequence to accomplish readout of the information stored in the shift registers through the associated output register, and after readout to condition the shift register for the subsequent transfer of information from the alternate shift register.

Under the above defined condition, the A shift registers are ready to be read out and information from the tape is being entered into the B registers. The Readout A indication on line 93 from trigger 91 is combined with a timing pulse in the Readout Cycle control to cause the deskewed information to be sequentially read out from the shift registers 25, 29 and 33 through associated triggers 24*a*, 24*b* and 24*n*, the latter trigger functioning as buffer readout devices. The operation of shifting registers is considered well-known in the art and the details to accomplish readout have been omitted from the drawings and description in the interest of clarity. However, for a discussion of the nature, function and operation of shifting registers, reference is made to "Arithmetic Operations in Digital Computers" by R. K. Richards, published by E. Van Nostrand Company, Inc., 1955, page 144 et. seq.

As more fully described hereinafter, associated with the Readout Cycle Control 100 is a Readout Counter, which counts each word as it is being read into the output register and generates a signal when the shift registers have been completely read out. The signals to shift the A shift registers are applied from readout cycle control 100 via line 103 to OR circuit 55, the output of which causes shifting via line 57 as heretofore described. Alternately, during readout of the B shift registers, the shifting signal would be provided by readout cycle control 100 on line 105 to OR circuit 81. The third output emanating from the top of readout cycle control is a line 106 to the computer labeled DATA AVAILABLE. In a conventional tape system, the individual stages from the output register 24 would be connected to a set of associated output gates and then applied after appropriate error checking and correction to a storage device for use by the computer. This is the manner in which readout from register 24 would be accomplished, but has been omitted from the drawing since it represents a conventional operation not considered necessary for an understanding of the present invention. For a general description of tape readout, reference is made to U.S. Patent 2,921,296 to T. G. Floros, FIGURE 1.

When readout of the deskewed message from the A shift registers has been completed, a signal is generated by the readout cycle control on line 107 and applied via OR circuit 14*a* and line 15 to reset the A output register 24. Following readout of the B register, a signal would be applied via line 109, OR circuit 14*b* and line 16 to reset the B output register 71. The next output on line 111 would reset the Readout A control trigger 91, while following readout of the B message the ROB control trigger 84 would be reset by a signal on line 113. Finally, the readout cycle control 100 generates a signal on line 115 which actuates pulse generator 21 to generate the prime or tag bit to be inserted through conductor 22 into the second position of the A shift registers. Alternately, following readout of the B shift registers, a signal would be generated on line 117 to activate pulse generator 19 to insert a prime bit into the second position of the B shift registers. The particular sequence at which these various signals are generated is more fully described hereinafter. Shifting registers 25, 29, 33 and 27, 31, 35 are shifting registers in which the bits of information are entered into the first trigger stage and sequentially shifted to the next higher order register position as succeeding bits arrive at the first register position. Likewise in the remaining shifting registers not shown, the information is sequentially shifted from the shifting registers to associated triggers of output registers 24 and 71.

Referring to FIGURE 4, there is illustrated in logical form details of the readout cycle control shown as block 100 in FIGURE 1. Where deemed necessary in the interest of clarity, certain of the components shown in FIGURE 1 are duplicated in FIGURE 4 and are identified by corresponding subscripts. Initially, as heretofore described, the READ request signal from the computer on line 11 actuates the BOR Control 12, a circuit adapted to provide an output signal in response to a command applied to its input, and a circuit which, in its simplest arrangement, could comprise a single-shot multivibrator. In response to an output signal from the BOR Control 12, a positive signal is applied to OR circuits 14A through 14F (FIG. 1), circuits 14E and 14F being illustrated in FIGURE 4. The output from the BOR Control 12 is also employed to set the $T_c$ trigger 23 in the "1" state, so that the initial input data from each record will be read into the A shift registers. A time pulse distributor 125, which in the illustrated embodiment generates time pulses TP–1 through TP–5, has its TP–1 output connected as one input to logical AND circuits 127 and 129. While time pulse distributors are considered well-known in the digital computer art, reference is made to FIGURE 16*d* of U. S. Patent 2,914,248 to H. D. Ross et al., entitled "Program Control for a Data Processing Machine," for one example of a suitable time pulse distributor which could be employed with the present invention. The second input to AND circuits 127 and 129 is the Readout A (RO–A) line 93 from trigger 91 (FIG. 1) and the Readout B (RO–B) line 86 from the trigger 84 (FIG. 2). The resultant outputs on line 107 and 109, as indicated relative to FIG. 1, are used to reset the A and B output registers respectively. Time pulse TP–2 from time pulse distributor 125 is applied to AND circuits 131 and 133, which similarly utilize the RO–A and RO–B lines 93 and 86 respectively as their second input. The outputs on lines 103 and 105 are applied through OR circuit 55 and line 57 to shift out the contents of the A or B shifting registers in accordance with whether the RO–A or RO–B line is actuated. Timing pulse TP–3 from time pulse distributor 125 is the data available line 106 (FIG. 1) which signals to the computer each time data is available for read out from the A or B shift registers. The TP–4 output from time pulse distributor 125 is applied to readout counter 135, which counts the output of the shift register as the message is being read synchronously to the computer and terminates shifting when the complete message has been read out. Readout counter 135 could comprise a predetermined counter which generates an output after a predetermined number of bits have been counted, eleven in the preferred embodiment. Counters of this type are well-known and available in the art, and the details thereof have accordingly been omitted from the drawing in the interest of clarity. Following readout of the set of shift registers, a signal is generated from the readout counter 135 on line 137 which actuates a single shot multivibrator 139 to apply a signal via line 141 to AND circuits 143 and 145 respectively. Likewise the signal on line 141 is applied through a delay circuit 147 to reset the readout counter 135 and to reset the RO–A or RO–B trigger 91 or 84 via lines 111 or 113 respectively. Depending on whether the A or B shift register has been read out, the RO–A or RO–B line 93 or 86 will provide the second input to AND circuits 143 or 145, the outputs of which are applied via line 115 or 117 to OR circuits 14F and 14E which in turn actuate pulse generators 19 or 21 to prime the second position in the B or A shift registers in the manner heretofore described. Thus in the above described arrangement, a timing cycle of five clock pulses is required for one readout cycle, each readout cycle consisting of reading one word from the A or B shifting registers, one bit from each shift register. A total of eleven readout cycles is thus required to completely read the contents of a set of full shift registers.

Referring now to FIGURE 5 there is illustrated a timing chart to clarify the general sequence of operations of the instant invention as heretofore described. The track 1 data is illustrated as a series of "1" bits which, as indicated in the illustrated embodiment, are assumed to recur at approximately six microsecond intervals. As previously indicated, in NRZI recording contemplated by the instant invention, a binary "1" is indicated as a positive signal, while a binary "0" is identified by the absence of a signal. For purposes of simplifying the ensuing description, it will be assumed that the maximum skew will occur between tracks 1 and N, and accordingly only tracks 1 and N are illustrated on the timing chart. Prior to read-in of data, the Beginning of Record signal, shown in the lower portion of FIGURE 5 as BOR Reset, is generated. During this interval, the signals to prime the second position of the A and B register are generated, and are indicated on the timing chart immediately below the BOR Reset as Prime A and Prime B. The BOR Reset signal also causes the data to be initially read into the A shift registers. Each track 1 data signal is followed by a clock pulse which, in the instant invention, is employed to shift the immediate preceding data bit one position in the shift register after the data bit has been transferred to the first position of the shift register. Following readout of the prime bit from track 1 shift register 25 into the associated output trigger 24A (FIG. 1), the trigger 24A will be set in the one state and generate a positive output indicated on the timing chart as TA1, the time at which it is shown to occur after clock pulse 11 being obviously exaggerated. As indicated on the track N data line, the track N data is displaced approximately three positions from the corresponding data on track 1 or, stated in another way, approximately three bits of skew exist between track 1 and track N. The track N data signals are followed by the associated track N clock pulses to produce reading and shifting of the data pulses into the associated A or B shift register 33 (FIG. 1). The resultant output following the eleventh shift operation causes readout of the prime signal, previously applied to position 2, into the AN trigger to generate the positive transition indicated on the timing chart as TAN. Under the above assumed conditions, outputs have been provided from all A shift registers to output buffer registers 24 and the resultant output from AND circuit 87 is applied to set RO–A trigger 91, which in turn actuates the readout cycle control 100 to generate a reset signal to reset output buffer register 24. This reset signal terminates the positive output of TA1 and TAN simultaneously so that the output on the TAN line appears as a short duration signal.

The output from And circuit 87 (FIG. 1) sets the RO–A trigger 91 to provide the positive transition indicated on the timing chart as RO–A, which in turn causes an opposite transition to occur in the trigger 23 indicated as the TC line in FIG. 5. Likewise the RO–B trigger will be set in the one state after N clock pulse 22 to produce the indicated output. Finally, the relative occurrence of the A and B readout signals are shown on the timing chart as Readout A Buffer Reg. and Readout B Buffer Reg. which as described with reference to FIGURE 4 requires a five cycle sequence to read out each shift register position. The duration of the readout cycle signal would therefore vary directly as a function of the speed of the timing pulse generator shown in FIGURE 4, and the duration of the timing signal shown in FIGURE 5 is not intended to define a specific duration but merely to illustrate the relative occurrence of the signals.

While a deskewing system utilizing two buffer shifting registers has been illustrated and described as a preferred embodiment, the principle of the invention is equally applicable to a deskewing system using three or more buffer shift registers. Using three shift registers A, B and C, for example, a separate control trigger would be employed with each set of shift registers. At beginning of record, the A trigger would be set on the B and C triggers reset. The readout cycle control would then function in accordance with the following table

| | |
|---|---|
| A on<br>B on | Reset A and Readout Buffer Shift Reg. A |
| B on<br>C on | Reset B and Readout Buffer Shift Reg. B |
| C on<br>A on | Reset C and Readout Buffer Shift Reg. C |

From the above table it will be evident that starting with A on, the turning of B on indicates that A buffer Shift Reg. is full and ready to be read out. Likewise the turning of C on with B on would indicate that B Buffer Shift Reg. is ready to be read out, and so forth. This indication of the On condition of pairs of control triggers could be provided by logical And circuits. Similar control logic to that employed in the preferred embodiment could be employed to shift from register to register in a predetermined sequence in response to a full register indication and to control readout of a complete message when a set of shifting register is full. The primary advantage of using three or more sets of shift registers is that smaller size shift registers could be employed for the same size skew capacity and faster readout to the computer could be provided than using a pair of larger capacity shift registers.

While the invention has been particularly shown and described with reference to a preferred embodiment thereof, it will be understood by those skilled in the art that various changes in form and details may be made therein without departing from the spirit and scope of the invention.

What is claimed is:

1. In a deskewing device for a magnetic tape recording system adapted to read a magnetic tape having the bits constituting the data and synchronizing signals disposed thereon in a plurality of parallel tracks, the combination comprising a plurality of sets of data storage registers, each set including a plurality of shift registers corresponding to and associated with each of said plurality of parallel tracks, each of said shift registers having a plurality of stages equal to the number of bits of anticipated skew, a pulse generator having its output connected to a predetermined position of each of said shift registers, means actuating said pulse generator by a timing signal from a source independent of said synchronizing signals on said magnetic tape to insert a prime signal in said predetermined position of each of said shift registers prior to readin of data, control means for initiating readin of data to the shift registers in one of said sets, means for shifting said prime and data signals through said shift registers by applying a sequence of shift pulses thereto, means for sensing when said prime signal is shifted through said associated shift register, means responsive to said sensing means for selectively switching from each shift register to the alternate shift register in said set, and means responsive to a full set storage register indication for initiating readout of the message stored therein, said full set storage indication being provided by read-out of the prime signals associated with each track.

2. In a deskewing system for magnetic tape recording adapted to read a multi-channel tape record having recorded thereon blocks of multi-bit characters composed of data and synchronizing signals, the combination comprising a first and second set of shift registers, each said set of shift registers including an individual shift register for each channel of said tape record, a readin control circuit, said control circuit including a bistable trigger for directing said tape data into the selected set of registers, a pulse generator having its output connected to a predetermined position of each of said shift registers, means actuating said pulse generator by a timing signal from a source independent of said synchronizing signals on said magnetic tape to insert a prime signal in said predetermined position of each of said shift registers prior to readin of data, a coincidence circuit associated with each shift register, said coincidence circuit having the output of said bistable control trigger and track data signals as the inputs thereof, means connecting the output of said coincidence circuit to the first position of the shift register associated with said track, means for shifting said prime signal and said data signals through said shift register by applying a shift pulse after each said signal, means for sensing when said prime signal is shifted through its associated shift register, means responsive to said sensing means for switching said data signals to the associated shift register in said alternate set of shift registers, means for detecting when all shift registers comprising said set of shift registers are filled and means responsive to said detecting means for initiating a readout cycle whereby the contents of said set of registers are read out in synchronous fashion while said data is being read into said alternate set of shift registers.

References Cited by the Examiner

UNITED STATES PATENTS

| | | | |
|---|---|---|---|
| 2,970,300 | 1/1961 | Witt | 340—174.1 |
| 3,197,739 | 7/1964 | Newman | 340—174.1 |

BERNARD KONICK, *Primary Examiner.*

IRVING SRAGOW, *Examiner.*

A. BERNARD, M. K. KIRK, *Assistant Examiners.*